Fig.2.

Aug. 12, 1941.　　　　L. ROBIN ET AL　　　　2,252,644
SPEED CONTROLLING DEVICE
Filed Nov. 27, 1936　　　　6 Sheets-Sheet 4

Inventors:
Léo Robin,
Mathieu van Roggen,
Attorneys

Aug. 12, 1941.  L. ROBIN ET AL  2,252,644
SPEED CONTROLLING DEVICE
Filed Nov. 27, 1936  6 Sheets-Sheet 5

Fig. 6.

Inventors:
Leo Robin,
Mathieu van Roggen,

Bailey Carson
Attorneys

Patented Aug. 12, 1941

2,252,644

UNITED STATES PATENT OFFICE 2,252,644

SPEED CONTROLLING DEVICE

Leo Robin and Mathieu van Roggen,
Sprimont, Belgium

Application November 27, 1936, Serial No. 113,074
In Belgium November 29, 1935

11 Claims. (Cl. 74—472)

The present invention relates to devices adapted to be used in connection with variable ratio transmissions and in particular transmissions to be interposed between a vehicle motor and the propelling wheels of said vehicle, for controlling the variations of said ratio.

The invention is more particularly concerned with devices of this kind which are responsive to variations of at least two functional factors, to wit the speed of the motor and the power obtained from said motor. Such devices include, on the one hand, means directly responsive to the variations of said speed, said means being hereinafter called "regulator," said regulator being arranged to produce an effect (force or displacement) variable in accordance with the value of said speed, with an adjustable interrelation between the respective values of the speed and the corresponding effects, and, on the other hand, interconnecting means between said regulator and the member for controlling the power developed by the motor (such as carburetor throttle, camshaft of feed pump, etc.), for adjusting said interrelation in such manner that said regulator, influenced both by the speed of the engine and by the power required or developed by said engine, operates the variable transmission device (gear box) under conditions depending upon both of the above mentioned factors.

The invention is more especially, although not exclusively, concerned with control devices of the kind above described for use in connection with a transmission the gear box of which is of the continuous type, and in particular a transmission in which the speed ratio between the driven shaft and the driving shaft has a minimum value equal to zero.

An example of such a transmission is illustrated in the inventors' United States Patent No. 2,162,124.

The object of the present invention is to provide a device of the kind above mentioned which is better adapted to meet the requirements of practice than similar devices used up to this time, and, in particular, which permits a positive control, that is to say which is positively responsive to the natural actions and reactions of the driver of the vehicle, instead of depending, as it is the case with many known devices of this kind, upon an external force.

An essential feature of the present invention consists in placing the regulator adjustment under the control of the engine power control member (throttle pedal for instance) directly actuated by the driver, through connecting means such that, at least for the largest part of the stroke of said member, the adjustment of the regulator is varied in a positive and continuous manner in accordance with the various positions of said member, this arrangement being particularly applicable in the case in which the regulator is of the hydraulic type, said connecting means then acting upon at least one pressure control valve provided in the discharge circuit of said regulator.

According to another feature of the present invention, said connecting means are adjustable at will, whereby they permit, although preferably maintaining the continuous and positive control, of modifying the law of adjustment variation of the regulator in accordance with the working conditions of the motor. In other words, this arrangement provides for a double variation of the adjustment of the regulator.

Still another feature of the present invention, concerns the case in which the regulator is of the hydraulic (or pneumatic) type, feeding a fluid under pressure which acts upon a piston controlling the change speed device, the adjustment of the regulator being variable under the action of connecting means interposed between the regulator and the motor power control member and acting for instance upon at least one pressure control valve. According to this feature of the invention, these means are devised in such manner that they act independently of the displacements of said control piston.

Still another feature of the invention, which is preferably used in combination with the preceding one, consists in making said piston independent of the resisting torque, this piston being merely subjected, for instance, to the action of a spring of given strength.

Still another feature of the invention, more especially applicable to the case of continuous change speed devices, consists in causing said piston to act upon a servo-motor, preferably of the hydraulic type, itself controlling the change-speed device.

Still another feature of the invention relates to devices of the kind above described in which the member for controlling the power required from the engine is operated by means of a pedal, handle, or the like the displacements of which include a first active stroke, during which it acts upon said member, and a supplementary stroke, during which it does not act upon said member. This feature consists in arranging the means for connecting the regulator and said pedal or the like so that the variation of adjustment is obtained as well during one as during the other of the two directions of movement of the pedal in its supplementary stroke.

Still another feature of the invention, consists in causing the pedal to act, in the course of its supplementary stroke, directly upon the control member of the change speed device, for instance, for producing a gear reduction so as to bring about an increase of the motor speed.

Still another feature of the present invention consists in arranging the devices of the kind above referred to in such manner that, when the throttle pedal or equivalent member is brought back to its initial position, the change speed device is automatically brought into its position corresponding to the highest possible gear ratio, in such manner as to correspond to the lowest speed.

Other features of the present invention will result from the following detailed description of some specific embodiments thereof.

Preferred embodiments of the present invention will be hereinafter described, with reference to the accompanying drawings, given merely by way of example, and in which.

Figure 7:
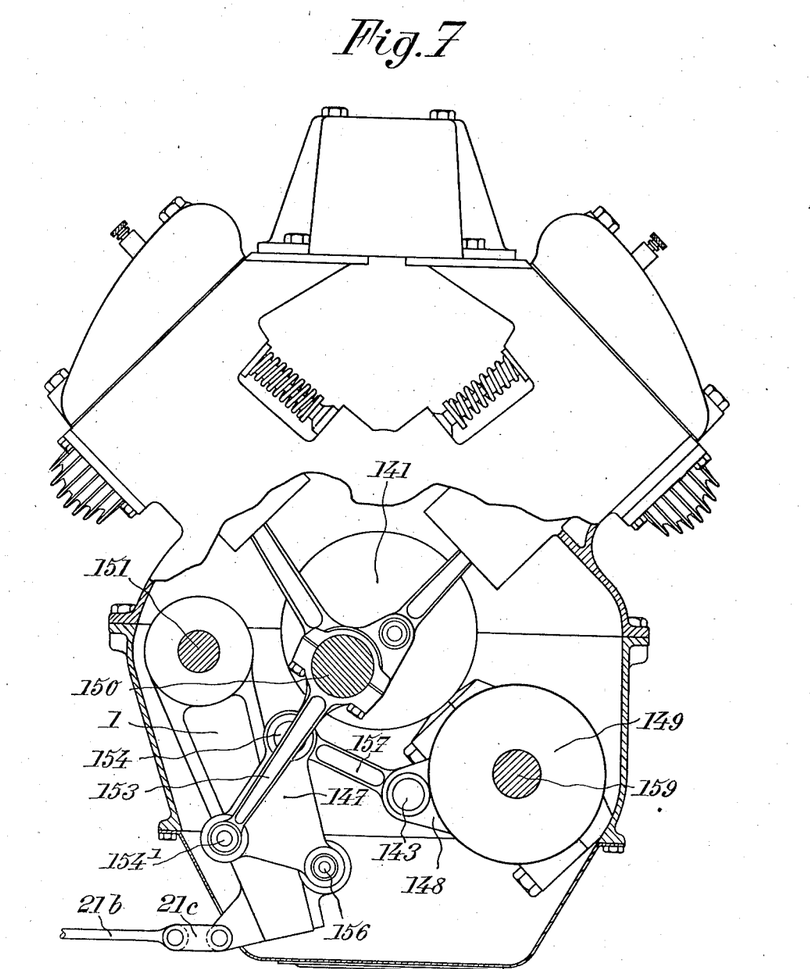
Fig. 7 is a vertical elevation partially broken away, illustrating the transmission according to the inventors' U. S. Patent No. 2,162,124 to which the invention is applied.

The present invention, relates for instance to a motor vehicle provided with a change speed device, of the continuous action type (although this is not a necessary condition), in which the variation of the gear ratio is obtained by actuating an element, which, in the example illustrated by the drawings, consists of a lever 1 as illustrated in Fig. 7, and which, in turn, actuates a continuous change-speed gear arrangement, as will hereinafter be explained. The lever 1 may also serve in the known manner for shifting contacts, by which the operations of a stepwise operating transmission drive can be connected or disconnected. It is the purpose of the present invention to obtain a device which automatically varies the gear ratio of the change speed device as a result of the mere fact of depressing the pedal 2 of the throttle 3 or equivalent device, controlling for instance the engine carburetor.

The system according to the present invention includes a regulator, driven by the engine, which develops a force or a power which is a function of the speed of said engine.

This regulator may be of the mechanical and centrifugal type.

It may also, as it will be supposed in the following description, be of the hydraulic type, in which case it consists, for instance of a pump 4, of the gear type or of any other type, coupled with the driving shaft.

It is known that it would be useless to actuate the speed change lever 1 by means of such a regulator if the characteristics thereof are invariable.

This results from the fact that said regulator acts upon the lever through the force that it develops under the effect of the engine speed, so that said force would vary according to an invariable law, depending merely upon the engine speed. This law would correspond to only one condition of working of the engine, for instance to starting upon level ground and with a given acceleration.

It is therefore quite necessary to combine with such a regulator means for varying (either as a function of the resisting torque applied to the transmission or as a function of the power required from the engine, the latter case being that considered in the present invention) what will be hereinafter called the adjustment of the regulator. In other words, these means are arranged to act upon at least one of the factors which, for a given speed of the engine, determine the force that will be developed by the regulator, or, in any case, the effect, that is to say the displacement, it will produce upon lever 1 or the like.

For instance, if the regulator is of the mechanical and centrifugal type, said means will act upon its mass or upon its elastic return spring. If, as it will be hereinafter supposed, the regulator is of the hydraulic type, it will be of course advantageous that these means operate valves or the like for producing variable pressure drops in the circuit of the control fluid.

According to the invention, said means are arranged in such a manner that they form a substantially positive connection between the member for controlling the power of the engine, or the elements for modifying the adjustment of said member, and the regulator, whereby, at least for the greatest part of the stroke of these elements for controlling the power of the engine, the adjustment of the regulator varies in a positive and continuous manner.

Furthermore, these means are preferably adjustable so as to obtain at will any of several possible laws of variation of the regulator adjustment according to the working conditions that are to be obtained.

These two adjusting features permit a double variation of the regulator adjustment.

According to an embodiment of the present invention, the hydraulic portion of the system includes a pump 4 as above mentioned, which is driven by the driving shaft of the engine and cooperates with a receiving element, such as a piston 5, subjected to the pressure produced by said pump which varies in accordance with the speed of the engine.

Preferably, this piston 5 is made wholly independent, that is to say, on the one hand independent of the resisting torque applied to the engine, and on the other hand independent also of the working of the various members that control the pressure control valves that will be hereinafter mentioned.

For this purpose, piston 5, which forms the control piston of a servo-motor S for actuating lever 1, moves in a cylinder 6 connected to pump 4 through a pipe 11 under the action of the variable pressure in said pipe and against the action of a spring 7, which may be adjustable. Pump 4, which may be the oil circulation pump of the engine, and which is driven in accordance with the speed of the engine, includes three gears 8, 9 and 10, of which gears 8 and 9 cooperate for producing in pipe 11, connected to pump 4, the variable pressure which acts upon piston 5. The servo-motor S further comprises a working piston 21 movable in a cylinder 21a against the action of a spring 25 when subjected to fluid pressure supplied by gears 9 and 10 through a pressure accumulator A and an inlet port 24. A slide valve 23 for controlling the inflow of compressed fluid through port 24 into cylinder 21a constitutes another part of servo-motor S. A lever 22 is secured to the piston rod of the working piston 21 so as to pivot about an axis 22a, while the piston rod of control piston 5 and slide valve 23 are pivotally secured to the opposite ends of lever 22, so that a movement of control piston 5 in a direction F produces a corresponding movement of slide valve 23 in opposite direction, thereby opening port 24. The fluid under pressure supplied by gears 9 and 10 now flows into cylinder 21a pressing working piston 21 toward the right and thereby actuating lever 1. By this movement of piston 21, slide valve 23 is returned to closing position.

Figure 1:
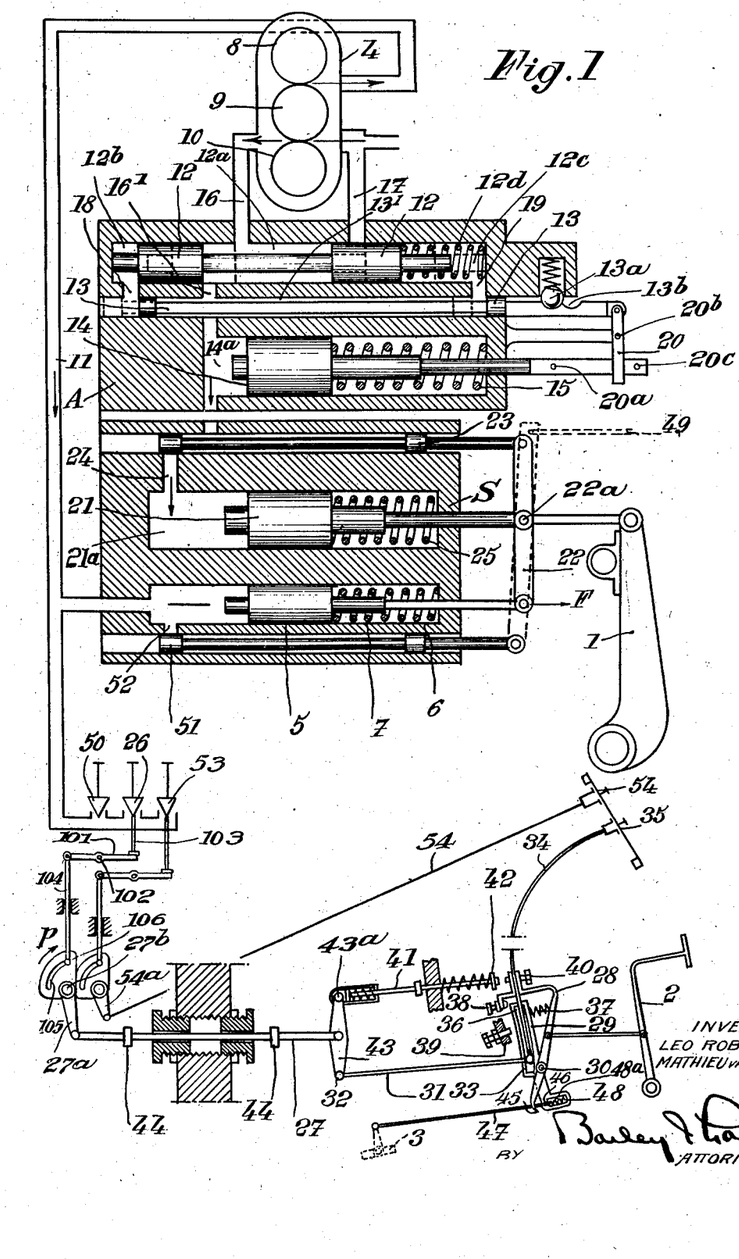
Fig. 1 is a view, partly in section and partly in elevation, of the whole of a change speed control device (for a change speed system of the continuous type), the hydraulic portion and the control linkage being shown on different scales, the whole being made according to the invention.

Of course, these hydraulic arrangements might be modified. For instance, the controls might be of the double acting type, as shown for example in Fig. 2 and described in detail in a subsequent part of this specification, which would permit of eliminating the spring 25 for returning working piston 21 into its initial position, as shown in the embodiment of Fig. 1. Such an arrangement would, for instance, be suitable in the case of a change speed device for obtaining, through the same control element 1, forward speeds and reverse speed, with an intermediate neutral position.

Figure 3:
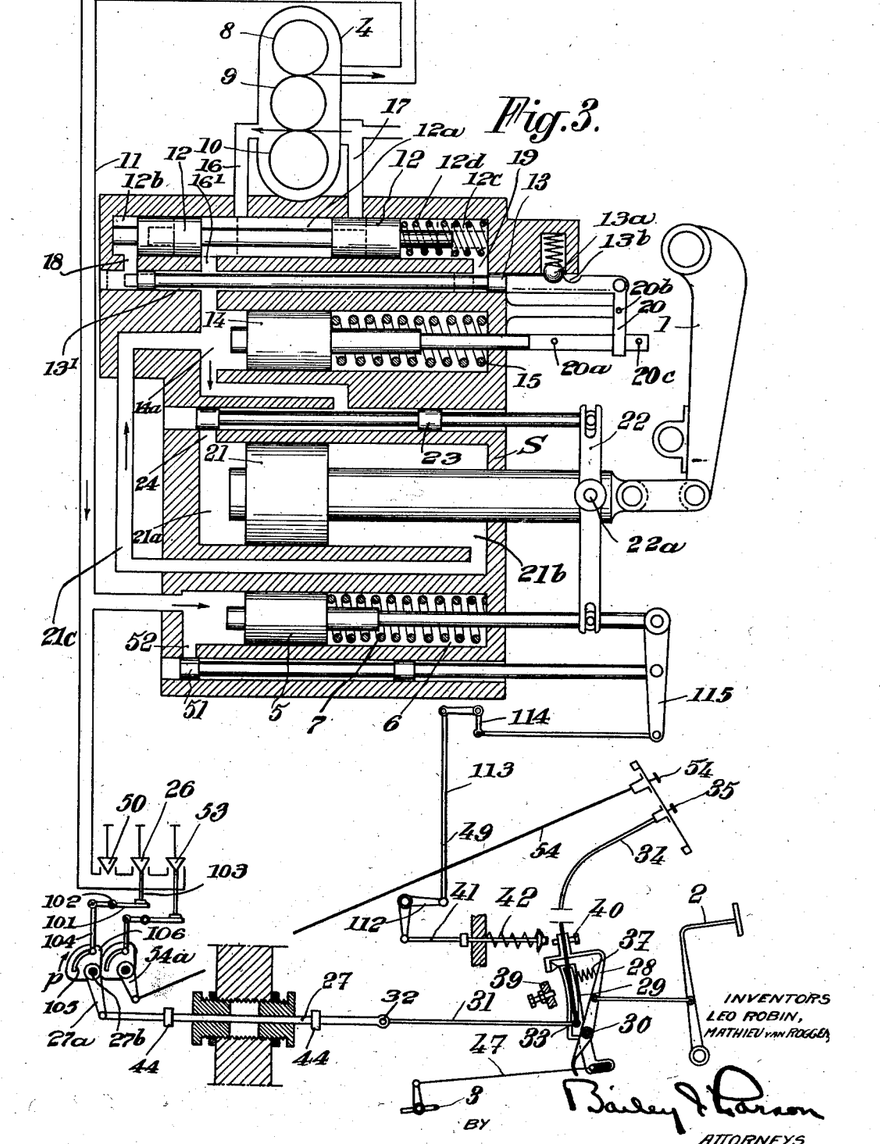
Fig. 3 is a view of a third embodiment of the invention.

Servo-piston 21 might also be of the counter-pressure type as shown by Fig. 3 and described in a subsequent part of this specification.

Figure 2:
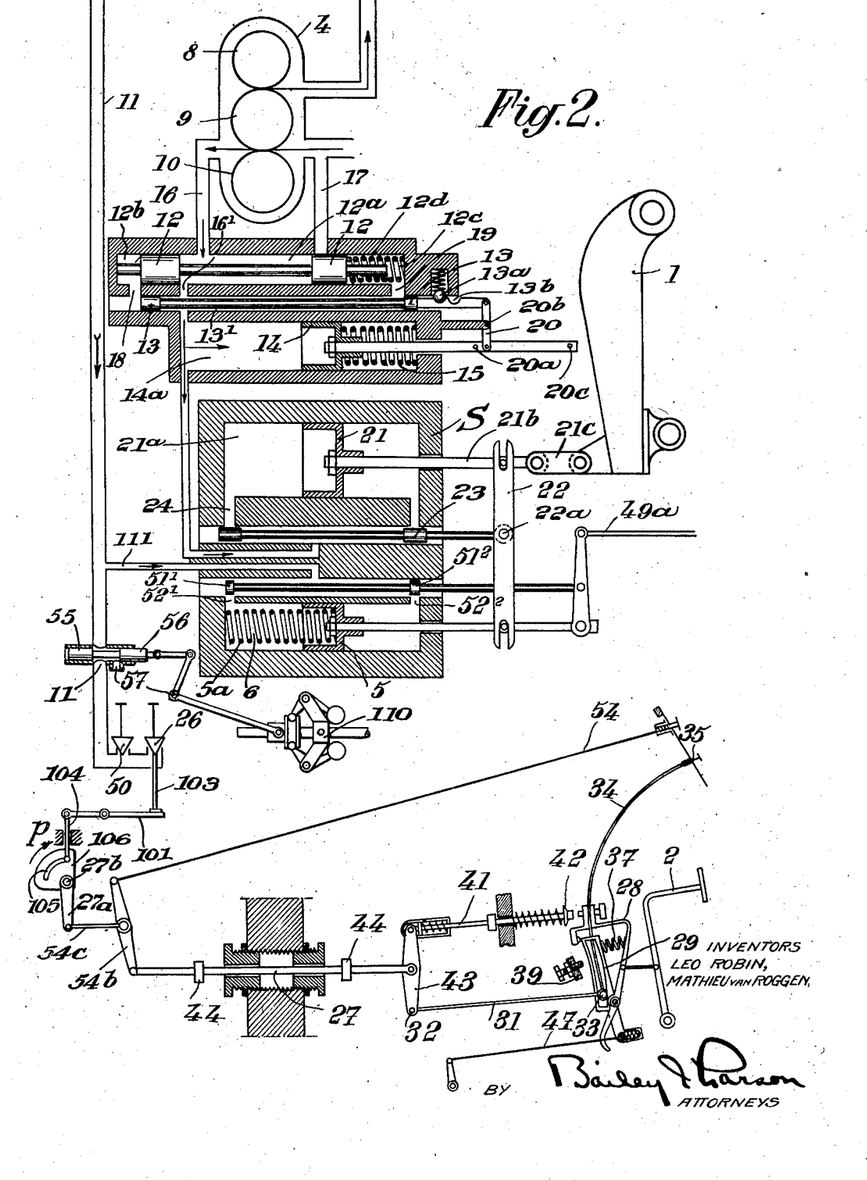
Fig. 2 is a similar view of another embodiment of the device according to the present invention.

As shown in Figs. 1 to 3, that part of pump 4 which consists of cooperating gears 9 and 10 is connected by two conduits 16 and 17 with a valve chamber 12a in which a double-valve piston 12 is slidably arranged which is of such length as to form control chambers 12b and 12c at the outer ends of chamber 12a. A spring 12d is arranged in control chamber 12c for urging double piston 12 toward the left. Chamber 12a communicates through a port 16¹ with a chamber 13¹ which is connected to the atmosphere at opposite ends and, in turn, communicates with a cylinder 14a and control chambers 12b and 12c through ports 18 and 19. As slide 13 is movably arranged in chamber 13¹ for controlling the operation of piston 12. Cylinder 14a forms a compression or storage chamber for the fluid supplied by gears 9 and 10, and contains a piston 14 which is movable therein against the action of a spring 15. The free end of the piston rod of piston 14 is provided with spaced stops 20a and 20c. As shown in Figs. 1 to 3, slide valve 13 has an extension at its right end provided with grooves 13b in which a spring-pressed ball 13a is placed for holding slide valve 13 in one or another position. A lever 20 is pivotally secured at the point 20b and connected to the outer end of slide valve 13.

The operation of this mechanism is as follows: Gears 9 and 10 supply a fluid under pressure through conduit 16 and port 16¹ into chamber 14a, whereby piston 14 is moved to the right against the action of spring 15 until stop 20a comes in contact with lever 20, pivoting the same about the axis 20b and thereby moving slide valve 13 toward the left, that is from its position shown in full lines to that shown in Fig. 1 in dotted lines. By this movement, ball 13a is lifted out of the left groove at the extension of slide valve 13 and placed in the right groove 13b for holding slide valve 13 in its new position. The movement of slide valve 13 also opens port 19 so that control chamber 12c is connected to the atmosphere and places control chamber 12b under the pressure supplied by gears 9 and 10, whereby double piston 12 is moved toward the right so as to close port 16¹ and to connect conduits 16 and 17. The operating fluid now circulates from gears 9 and 10 through conduit 16, chamber 12a, and conduit 17 back to gears 9 and 10, while piston 14 moves toward the left under the action of spring 15 and ejects the fluid from storage chamber 14a into cylinder 21a of the servo-motor. During this return movement of piston 14, stop 20c comes in contact with lever 20b and pivots said lever so as to return slide valve 13 to its original position. Control chamber 12b is hereby connected to the atmosphere and spring 12d returns the double piston 12 to the position shown in full lines in Fig. 1. Gears 9 and 10 are able to supply a new charge of fluid under pressure to the storage chamber 14a.

For controlling the fluid pressure in pipe 11, which acts upon control piston 5 of the servo-motor S, we provide at least one pressure control valve 26 which is connected to pipe 11 and actuated for example by the following arrangement:

Valve 26, which is provided with a valve stem 103 for lifting the valve from its seat, is controlled directly by the throttle pedal 2, by connecting the latter with said valve, through means, preferably of a mechanical nature, arranged in such manner as to be adjustable as desired by the driver, so as to permit of obtaining several laws of variation of the regulator adjustment. These connecting means consist for instance of a link system including a lever 101 pivotable about an axis 102 and abutting at its right end against valve stem 103. A link 104 is pivotally connected to the left end of lever 101 and slidably engages at its lower end in a curved slot 105 in a disc 106 which has an arm 27a secured thereto and is pivotable about an axis 27b. Arm 27a is pivotally connected to a rod 27 which, in turn, is shifted when the driver depresses or releases the throttle pedal 2. When pedal 2 is being depressed and rod 27 moved toward the left in Fig. 1, disc 106 is turned in the direction shown by the arrow P, whereby link 104 is gradually drawn downwardly and valve stem 103 raised to open valve 26.

Rod 27 is connected to the throttle pedal 2 through a pivoting system comprising a substantially Z-shaped element 28 connected to pedal 2, and a slotted element 29, which elements are pivotable relative to each other about an axis 30. A spring 37 is interposed between elements 28 and 29 and normally presses element 29 against a stop 38 secured to element 28, whereby the normal position of element 29 relative to element 28 or the degree of normal angularity of said two elements can be adjusted. As long as member 29 is pressed by spring 37 against stop 38 members 28 and 29 pivot about axis 30 as one element. A connecting rod 31 is pivotally secured at 32 to one end of a lever 43 which, in turn, is pivotally connected substantially at its center to rod 27 and at the other end 43a to a rod 41. The other end of connecting rod 31 is provided with a sliding member 33 which is movable in a slide way 36 and the position of which, in said slide-way can be adjusted by means of a flexible cable 34 which may be operated, for example, from the instrument board at a point 35.

On the other hand, the throttle pedal is connected with the throttle 3, for instance through pivoting member 28.

Consequently, the system is devised in such manner that by depressing the throttle pedal a gradual opening of valve 26 is produced, of an amplitude variable at will, according to the position of element 33 on its slideway, this amplitude being variable from a value approximating zero or equal to zero (if the axis of sliding element 33 coincides with axis 30) to any value corresponding to the maximum speed to be imparted to the engine under predetermined load conditions.

Furthermore, by giving the slideway a suitable shape, for instance that of a circular arc the center of which would be at 32 for the released position of the pedal, the system may, if necessary, be devised in such manner that, whatever be the amplitude that is chosen for the variation of the valve 26, the initial value thereof, that is to say its minimum value corresponding to said released position, remains substantially the same, this minimum value corresponding to the idling of the engine, or being even equal to zero if idling is ensured through other means.

Figure 4:
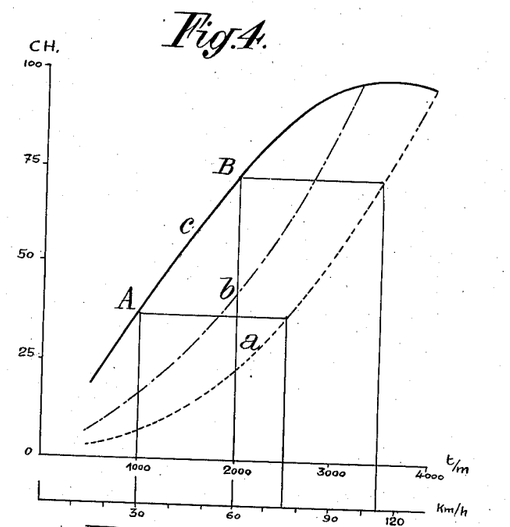
Figs. 4 and 5 are characteristic curves of a vehicle engine, these curves being given for facilitating explanations.
Figure 5:
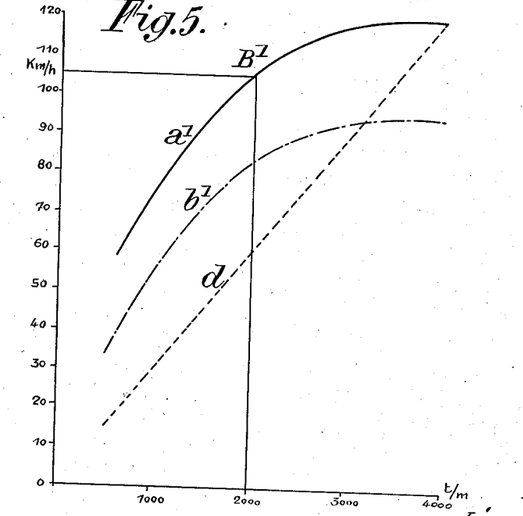

In order to facilitate explanations, we have shown, in Figs. 4 and 5, the characteristic curves of operation of an automobile vehicle.

In Fig. 4, curve a represents, in the case of running on level ground, the power consumed at various speeds of the vehicle (friction and head resistance in air), as a function of the engine speed. The power is plotted, in horse-power, in ordinates, whereas the abscissas correspond to the engine speed in revolutions per minute and the speed of the vehicle in kilometers per hour.

Curve b is an analogous curve, the vehicle running up a gradient of, say, 7%. As for curve c it represents, for various engine speeds, the power that the engine can develop.

In Fig. 5, curve d represents the speed of the vehicle as a function of the engine speed for a given gear ratio (said curve being, therefore a straight line), and curves $a^1$, $b^1$ represent the speed of the vehicle when making use, for all driving speeds, of the full power of the engine (curve $a^1$ on level ground and curve $b^1$ up a gradient of 7%).

It will first be seen, by comparing these curves, that, when the vehicle is running at 50 kilometers per hour with the gear ratio of curve d, the engine is working under conditions which are not economical since the carburetor throttle is partly closed, developing for 1000 revolutions per minute only a small portion of its maximum power. As a matter of fact, it is found in Fig. 4 that the maximum power at 1000 revolutions per minute would be capable of driving the vehicle at a speed of 75 kilometers per hour. It would therefore be necessary, in order to affect most efficient operation of the vehicle, to increase the ratio of the speeds of the driven shaft and the driving shaft.

Of course, if we could, by thus increasing the gear ratio, drive the vehicle at a speed of 75 kilometers per hour with an engine speed of 1000 revolutions per minute, we could not further increase the speed of the vehicle while keeping the gear ratio at this high value. Fig. 5 shows that if the engine speed is brought up to 2000 revolutions per minute, it is possible to obtain, still at full power of the engine, not 2×75 kilometers per hour, but only 107 kilometers per hour. It would therefore be necessary to reduce the multiplication.

It will now be shown that the invention permits, through suitable variations of the gear ratio, of making use of the maximum power of the engine, by causing it to run under the best possible conditions of efficiency, silence and fatigue.

First, when starting, supposing that spring 7 has a certain initial tension, and, furthermore, that the circuit of the liquid is provided, either at valve 26 or at any other place, with a certain initial pressure release, the whole may be arranged in such manner that, for instance, piston 5, which is supposed to be first in the position corresponding to the lowest speed ratio, moves, in the direction corresponding to an increase of this ratio, only when the engine speed reaches, for instance, 700 revolutions per minute, whereas the speed in question is only, say, 500 revolutions per minute, for idling.

Under these conditions, it is seen that, if a certain adjustment of the regulator were adopted and kept without modification, that is to say if a certain constant value of valve opening 26 were chosen, the total stroke of piston 5 would take place for instance at speeds ranging from 700 to 1000 revolutions per minute. For instance, it would be possible, in this way, to start the vehicle on level ground with a certain acceleration.

If another constant value were chosen, that is, if the opening of valve 26 were made larger, piston 5 could perform its entire stroke so as to reach a position corresponding to the maximum of the ratio of the speed of the vehicle and the speed of the engine only when this speed reaches 3000 revolutions per minute. But, in this case, the opening of valve 26 would also change the starting point of the action, which would constitute an unacceptable condition, since piston 5 would begin moving only at a speed of the engine of, for instance, 2500 revolutions per minute.

The device according to the present invention solves the problem since the pedal acts positively upon the pressure control valve 26 so as to vary it according to a law which, can itself be varied at will according to the position of sliding member 33 along its slideway, these various results being obtainable while maintaining the initial valve opening, that is to say the opening corresponding to the released position of the pedal, at a substantially constant value. As a consequence, the starting point of the action of the liquid upon piston 5 remains the same.

Therefore, with the device according to the invention, the engine running for instance at idling at a speed of 500 revolutions per minute, the engine speed is gradually increased, in the usual manner, by depressing the pedal. On the other hand, due to the gradual opening of valve 26, piston 5 starts moving, producing an increase of the speed ratio, and it reaches its extreme position for a value of the engine speed that depends upon the curve of variation of the regulator adjustment that has been chosen, that is to say upon the position of member 33 along its slideway.

If sliding member 33 coincides with axis 30, the movements of the throttle pedal will have no effect upon the regulator adjustment, and a speed of 800 revolutions per minute will suffice (all other adjustments being supposed to remain unchanged) for bringing piston 5 into its extreme position corresponding to the maximum speed ratio.

If sliding member 33 is brought into an intermediate point of the slideway, the opening of the valve 26, as a function of the total stroke of the element 29, may be such that, for instance, piston 5 reaches the end of its stroke for an engine speed of 5000 revolutions per minute.

Under these conditions, a speed of 105 kilometers per hour, in the above example, calling for a power of about 72 horsepower can be obtained, at full power of the engine, with an engine speed of only 2,000 revolutions per minute, that is to say a speed for which the piston 5 will have moved only a portion of its full stroke, which is of course desirable since, if head resistance occurs to decrease for any cause, the engine speed being then allowed to increase, piston 5 will move further, which will correspond to a new equilibrium between the engine speed and the gear ratio.

If, finally, sliding member 33 is at the end of its stroke, the number of revolutions per minute necessary for producing the complete stroke of the piston will be still more considerable and the tendency of the apparatus to produce a gear reduction will be greater.

It will be readily understood that one of the chief advantages of such a control will be to cause the engine to run at full power and with moderate speeds.

But, by causing the engine to work under such conditions, for instance at 75 kilometers per hour for an engine speed of 1,000 revolutions per minute by making use of the maximum gear ratio which, in the case of an ordinary transmission, would correspond to a supermultiplication, it becomes necessary to provide means for producing a speed reduction, if it is desired to increase the engine speed and that of the vehicle.

Such means may be given many different embodiments, for instance the following one:

The control of throttle 3 or the like, is combined with the control of valve 26 in such manner that the full displacement of pedal 2 is divided into two portions:

A first portion necessary for bringing throttle 3 into the fully opened position, or a position close thereto; and A supplementary portion, during which the throttle is no longer influenced, the pedal acting merely upon valve 26, by increasing it when the pedal is depressed and reducing it when said pedal is allowed to move upwardly.

For instance, as previously described and shown by the drawings, the two elements 28 and 29 interposed between the pedal and rod 27 are normally applied against each other, for instance under the action of a spring 37, the respective positions of these two elements being, optionally determined by an adjustable stop 38.

The element 29, which carries slideway 36 is adapted to cooperate with a stop 39 limiting its movement.

As shown by Figs. 1 and 2, element 28 is caused to cooperate, through another abutment 40, with a kinematic device capable of acting upon rod 27. This kinematic device consists, for instance, of a rod 41 subjected to the action of a return spring 42 and acting, in a manner analogous to that of connecting rod 31, upon an equalizer bar 43 pivoted to rod 27.

This device works in the following manner:

The two elements 28, 29 act during the first part of the stroke as a single rigid member, as previously described, by pivoting together about the axis 30 and shifting connecting rod 31, whereby the amount of shifting transmitted to valve 26 through lever 43, which pivots at the first part of the stroke about the axis 43a, rod 27 and levers 27a, 104 and 101, depends on the amount of movement of pedal 2 and the distance of sliding member 33 from the pivotal axis 30. As shown in the drawings, the lower end of element 29 is connected to a rod 47 which pivots throttle 3, so that simultaneously with the opening of valve 26, throttle 3 is likewise opened. During the first part of the stroke the lever 43 pivots about the axis 43a. When member 29 is stopped by abutment 39, and the pedal 2 is further depressed, the abutment 40, which is adjustably secured to member 28, comes in contact with rod 41, shifting the same toward the left so that lever 43 now pivots about the axis 32, thereby shifting the rod 27 to produce a further opening of valve 26.

Of course, the various factors on which the respective positions of the various elements depend, that is to say more particularly abutments 39 and 40, return spring 42, and the return position of rod 41, are made adjustable, preferably from a distance.

The stroke of rod 27 may itself be limited by means of safety abutments 44.

It is therefore clear that such a device will permit, in particular, for a given adjustment of its parts, of complying with the conditions above stated, which are the following: (the vehicle being supposed to run on level ground)

a. The obtainment of speed conditions such that, for instance, the speed of 75 kilometers per hour can be reached for an engine speed of 1,000 revolutions per minute, with the throttle fully opened, piston 5 being, at this time at the end of its stroke since the speed ratio has a maximum value; and b. The possibility, by further depressing pedal 2, of gradually further increasing the opening of valve 26, while keeping the throttle in the fully opened position, which it has reached by the first part of the stroke, so as to return piston 5 and to reduce the gear ratio in such manner that the engine speed can increase and assume a value of, say, 2,000 revolutions per minute, corresponding to the required power (points B and B¹ of Figs. 4 and 5).

It should be noted that, since this opening takes place in a gradual manner, any dangerous racing is prevented.

If the first portion of the stroke of the throttle pedal brought said throttle only into a position close to that of full opening, the connecting means might be provided with means for completing this opening for a determined point of the supplementary portion of the stroke, these means consisting for instance of an extended portion 45 of element 28 capable of cooperating with a lug 46 of rod 47 which controls the position of the throttle, which lug moves in an elongated slot 48 of element 29 against the action of a spring 48a.

During the first part of the stroke, lug 46 rests against the left end of slot 48, so that rod 47 is moved directly by element 29 until element 29 comes to a stop against abutment 39. If, during the second part of the stroke, element 28 has been further pivoted about the axis 30 and has depressed rod 41 to a certain extent, portion 45 of element 28 comes in contact with lug 46 and moves the same toward the right against the action of spring 48a to complete the opening movement of throttle 3.

Whatever be the embodiment that is chosen, we obtain a system the operation and the advantages of which are believed to result clearly from the preceding description.

The following advantages are particularly pointed out:

The device according to the invention permits of obtaining the positive control of the elements, whereby the vehicle is subjected to the only control of the driver, without any action or force independent of his will being brought into play at any time;

It permits the engine to work at slow economical and silent speeds;

It ensures a gradual and always correct working owing to the absence of any mechanical or hydraulic connection between rod 27 and piston 5, other than valve 26.

It should also be noted that said device, especially when made according to the embodiments above described, is such that the fact of allowing the throttle pedal to move upwardly produces the return of the change speed device to its position corresponding to its maximum gear ratio, whereby the engine speed is brought back to its minimum value. This constitutes a kind of free-wheel arrangement, without involving the disadvantages thereof, since a drive of the engine by the vehicle can still be performed.

Finally, the system above described may be combined with various arrangements and especially the following:

According to one of these arrangements, we cause to co-act with piston 5 and its cylinder 6, a positive control constituted by a valve rod 51 acting upon a port 52 of cylinder 6. The valve is operated by a rod 49.

According to the modification shown in Fig. 2, the control members, that is, piston 5 and valve 51, may be double acting so that the device according to the invention can effect through the same lever 1 an automatic change of the gear ratio not only at the forward drive but also at the reverse drive with an intermediate neutral position. For this purpose slide valve 51 comprises two valve pistons $51^1$, $51^2$, which are interposed between cylinder 6 and pipe 111 which is connected to pipe 11 and through which the pressure is supplied which is to act on piston 5. Valve piston $51^1$ cooperates with an inlet opening $52^1$ at the left side of cylinder 6 and valve piston $51^2$ with an inlet opening $52^2$ at the right side of cylinder 6. Piston 5 when in a position of rest is maintained substantially at the middle of cylinder 6 by springs 5a and 5b acting on opposite sides of piston 5. The position of slide valve 51, that is, of valve pistons $51^1$ and $52^2$, is controlled by a rod 49a so that the compressed fluid is supplied either to the left side of piston 5 or to the right side thereof. If, for driving forwardly, the double valve piston $51^1$, $52^2$ according to Fig. 2, is moved to such an extent that the compressed fluid enters the left part of cylinder 6 through valve opening $52^1$, the fluid at the right side of piston 5 is ejected to the outside through valve opening $52^2$ and piston 5 operates merely in accordance with the hydraulic control and adjusts by its movement toward the right the various speed ratios of the forward drive.

If, however, the double valve piston $51^1$, $51^2$ is moved by rod 49a very far toward the left, the entire stroke of piston 5 toward the right is insufficient to return valve piston $51^1$, $51^2$ to its neutral position, that is, to the position shown in Fig. 2, so that piston 5 operates automatically within its entire range of movement. However, at a smaller original adjustment of valve pisto $51^1$, $51^2$, the range within which piston 5 operates automatically, can be limited to any desired extent.

The same is true if valve piston $51^1$, $51^2$ is moved originally toward the right. In that event, the compressed fluid enters cylinder 6 through valve opening $52^2$, while the fluid at the left side of piston 5 is expelled through opening $52^1$. If piston 5 then moves from its central position shown in Fig. 2 toward the left, it adjusts the various speed ratios for the reverse drive.

According to the modification shown in Fig. 3, cylinder 14 communicates with the left side of cylinder 21a through opening 24 which is controlled by slide valve 23 in the same manner as described relative to Figs. 1 and 2, and with chamber 21b at the right side of piston 21 through a pipe 21c. Fluid under pressure is, therefore, supplied to chamber 21b from cylinder 14a. Upon an increase of pressure in circuit 11 and a corresponding movement of piston 5 toward the right, slide valve 23 is moved toward the left so that fluid under pressure can pass into cylinder 21a to act on the left face of piston 21. Since the total pressure upon the left face of piston 21 is larger than the total counterpressure acting on the right face because of the larger surface area of the left face, piston 21 is moved toward the right, returning the fluid in chamber 21b to cylinder 14a through pipe 21c and actuating lever 1. By this movement, slide valve 23 is also moved toward the right to cover the opening 24. Upon a reduction of the speed of the engine and a reduction of pressure in circuit 11, piston 5 moves toward the left under the action of spring 7. Slide valve 23 is hereby moved further toward the right and past the opening 24 so that the pressure in cylinder 21a at the left side of piston 21 is discharged through opening 24 toward the outside, while the pressure communicated to chamber 21b through pipe 21c returns piston 21 to normal position. The returning movement of piston 21 also brings back slide valve 23 to closing position, as shown in Fig. 3.

According to another arrangement shown in Figs. 1 and 3 a special pressure releasing valve 53 may be provided which may be operated for example in a manner similar to valve 26 through a system of levers and a slotted disc to which an arm 54a is secured. This arm may be pivotally connected to a rod 54 or similar means leading for example to the instrument board. By means of this separate valve 53 the driver is able to control the idling of the engine and to correct the pressure in pipe 11 when the oil temperature varies.

However, valve 53 may be omitted, as shown in Fig. 2, if rod 54 is pivotally connected to rod 27 through a lever 54b which, in turn, is pivotally connected through a link 54c to the arm 27a. In such a manner, valve 26 can be operated independently of any movement of the throttle 3 since lever 54b pivots about the end of rod 27.

Besides, these various valves might be provided with thermostatic controlling means for adjusting them in accordance with the oil temperature.

Finally, if necessary, in order to avoid accidental startings, in the case of a defective adjustment or of too low a temperature of the oil, and in order to obviate any dangerous racing, it is possible, according to the present invention, as shown in Fig. 2 to insert in the fluid conduit system, a safety valve 55 actuated by a centrifugal governor 110. For instance, this valve 55 includes a valve piston 56 devised in such manner that, when the engine is idling, piston 56 is in the position shown in Fig. 2, so that the oil escapes through port 57, whereas, when the engine accelerates, governor 110 moves piston 56 toward the left so that port 57 is closed and, finally, if the speed becomes excessive, the solid part of the valve piston closes conduit 11, producing the quick displacement of piston 5 toward the position corresponding to the maximum speed, which obviously tends to oppose racing.

Of course, it should be well understood that the specific examples above described have been given merely by way of example.

For instance, the means for producing a reduction of the gear ratio for increasing the engine speed could be made in any suitable manner, for instance in such manner, as shown by Fig. 3, that the supplementary stroke of the pedal acts, no longer on rod 27, but directly upon the positive control 49, that is through rod 41, lever 112, rod 113, lever 114 upon lever 115 and slide valve 51.

Figure 6:
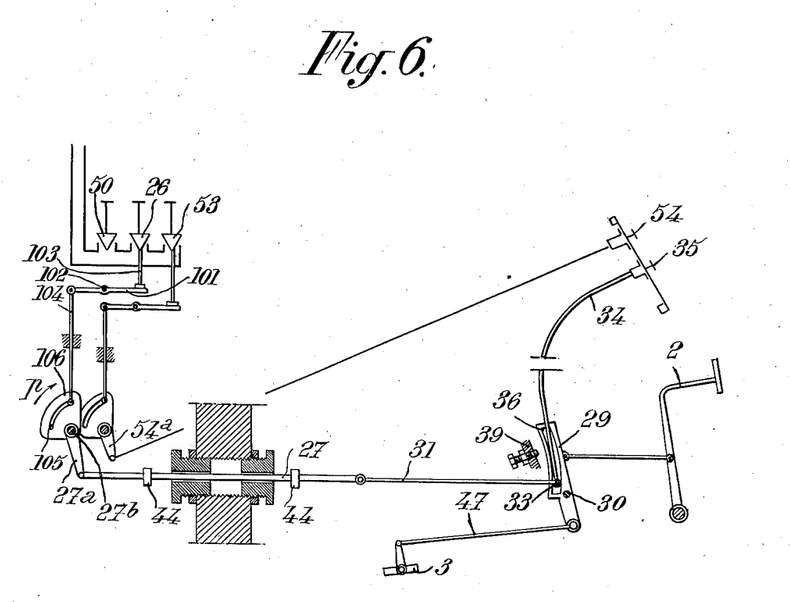
Fig. 6 is a view showing a modification of the control linkage.

As shown in Fig. 6, the rods 27 and 31 are connected directly together. Also, the elements 45, 46, and 48a, shown in Figs. 1 to 3, inclusive, are omitted, and the element 29 is directly connected to the rod 47.

In Fig. 7, the lever 1 is identical with the lever 1 of Fig. 2. Said lever is connected to the rod 21b of piston 21 by a link 21c.

The lever 1 pivots around a fixed axis 151 and carries the axis 156 of a solid lever 147. One of the ends 154' of lever 147 is pivoted to a driving connecting rod 153, the head of which is pivoted on a crank 150 of crankshaft 141 of an internal combustion engine having cylinders arranged in a V.

The other end 154 of solid lever 147 is pivoted to a driven rod 157, the latter being pivoted at its other end 143 to a lever 148 driving the driven shaft 159 of the transmission, by a free wheel arrangement 149, the construction of which is described in the inventors' application S. N. 110,527. The whole of the change speed arrangement is similar to that described in Patent No. 2,162,124 wherein four arrangements, each made up of the elements 153, 147, 157, 148 and 149, are used. The driving sectors of the said four arrangements are connected to four different cranks of the crankshaft, each being spaced with respect to the adjacent sectors by 90°.

The degree of demultiplication of said change speed arrangement depends on the distance of the common axis 156 of the four solid levers of the four elementary arrangements from the driven shaft 159, the said distance being variable by the pivoting of the lever 1 around its axis 151.

In a general manner, while we have, in the above description, disclosed what we deem to be practical and efficient embodiments of the present invention, it should be well understood that we do not wish to be limited thereto as there might be changes made in the arrangement, disposition and form of the parts without departing from the principle of the present invention as comprehended within the scope of the appended claims.

What we claim is:

1. In a power plant including an engine for performing a certain work and a change speed device associated with said engine on the output side thereof, a control system which comprises, in combination, a fluid pump arranged to act as a regulator driven by said engine so as to be responsive to speed variations thereof, a circuit for said fluid pump, a piston subjected to the fluid pressure in said circuit, means for operating the change speed device in accordance with the displacements of said piston, adjustable valve means in said circuit for determining the law of displacement of said piston as a function of the engine speed, an element, for controlling the power delivered by said engine, adjustable control means, interposed between said element and said adjustable valve means, for acting upon said valve means in accordance with variations of the power delivered by said engine, means for modifying the adjustment of said adjustable control means and manually adjustable means operable independently of the last-mentioned means for adjusting said valve means.

2. A control system according to claim 1 including means for making said piston independent of variations of the torque of the engine.

3. In a power plant including an engine for performing a certain work and a change speed device associated with said engine on the output side thereof, a control system which comprises, in combination, a fluid pump arranged to act as a regulator driven by said engine so as to be responsive to speed variations thereof, a circuit for said pump, a piston subjected to the fluid pressure in said circuit, means for operating the change speed device in accordance with the displacements of said piston, a spring of predetermined strength acting on said piston so as to oppose the action of said fluid pressure thereon, adjustable valve means in said circuit for determining the law of displacement of said piston as a function of the engine speed, an element, for controlling the power delivered by said engine, adjustable control means, interposed between said element and said adjustable valve means, for acting upon said valve means in accordance with variations of the power delivered by said engine, means for modifying the adjustment of said adjustable control means and manually adjustable means operable independently of the last-mentioned means for adjusting said valve means.

4. In a power plant including an engine for performing a certain work and a change speed device associated with said engine on the output side thereof, a control system which comprises, in combination, a fluid pump arranged to act as a regulator driven by said engine so as to be responsive to speed variations thereof, a circuit for said fluid pump, a piston subjected to the fluid pressure in said circuit, a servo-motor operative by said piston for controlling said change speed device in accordance with the displacements of said piston, adjustable valve means in said circuit for determining the law of displacement of said piston as a function of the engine speed, an element, for controlling the power delivered by said engine, adjustable control means, interposed between said element and said adjustable valve means, for acting upon said valve means in accordance with variations of the power delivered by said engine, means for modifying the adjustment of said adjustable control means and manually adjustable means operable independently of the last-mentioned means for adjusting said valve means.

5. In a power plant including an engine for performing a certain work and a change speed device associated with said engine on the output side thereof, a control system which comprises, in combination, a fluid pump arranged to act as a regulator driven by said engine so as to be responsive to speed variations thereof, a circuit for said fluid pump, a piston subjected to the fluid pressure in said circuit, a hydraulic servo-motor operative by said piston adapted to act on said change speed device for operating it in accordance with the displacements of said piston, said servo-motor being operated by fluid under pressure from said pump, adjustable valve means in said circuit for determining the law of displacement of said piston as a function of the engine speed, an element for controlling the power delivered by said engine, control means, interposed between said element and said adjustable valve means, for acting upon said valve means in accordance with variations of the power required from said engine and manually adjustable means operable independently of the last-mentioned means for adjusting said valve means.

6. A control system according to claim 4, in which said fluid pump comprises at least three gears cooperating so as to constitute at least two pairs of gears, one of said pairs producing the fluid pressure for actuating said piston and the other pair producing the fluid pressure for operating said servo-motor.

7. A control system according to claim 1, further comprising a second pressure control valve in the circuit of said pump and means for manually controlling said second valve, said last means being connected to said transmitting means so that said piston is restrained as soon as it has performed a stroke of a length determined by the adjustment of said last means.

8. In a power plant including an engine for performing a certain work and a change speed device associated with said engine on the output side thereof, a control system which comprises, in combination, an adjustable regulator driven by said engine to be responsive to speed variations thereof, a member interposed between said regulator and said change speed device for operating the latter, adjustable means for determining the law of operation of said regulator as a function of the engine speed, an element for controlling the power delivered by said engine, a movable means operative at will by the person in charge of the power plant for operating said element, said movable means being so mounted that for a portion of its movement it causes said element to operate, whereas, for a supplementary portion of its movement, it remains without action upon said element, said movable means comprising two rocking levers pivotable relative to each other, means for operating said levers, said operating means being directly connected to one of said levers, and a spring interconnecting said levers for transmitting the movement of said first lever to the second lever, said first lever, after overcoming a certain amount of play, being adapted to act upon the means interposed between said movable means and said adjustable means for controlling said adjustable means, an element for limiting the movement of said second lever, said second lever being connected to said power control element and directly to said interposed means for controlling said adjustable means, and means interposed between said movable means and said adjustable means in accordance with the displacements of said movable means for the whole of the displacement of said movable means.

9. In a power plant including an engine for performing a certain work and a change speed device associated with said engine on the output side thereof, a control system which comprises, in combination, a fluid pump arranged to act as a regulator driven by said engine so as to be responsive to speed variations thereof, a circuit for said fluid pump, a piston subjected to the fluid pressure in said circuit, means for continuously operating the change speed device in accordance with the displacements of said piston, adjustable valve means in the circuit for determining the law of displacement of said piston, an element for controlling the power delivered by said engine, and means interposed between said element and said valve means for controlling said valve means in accordance with variations of the power delivered by said engine, said means interposed between said element and said valve means comprising at least one rocking lever and means for connecting the rocking lever to said valve means, the point of engagement between said connecting means and said rocking lever being adjustable.

10. In a power plant including an engine for performing a certain work and a change speed device associated with said engine on the output side thereof, a control system which comprises, in combination, a fluid pump arranged to act as a regulator driven by said engine so as to be responsive to speed variations thereof, a circuit for said fluid pump, a piston subjected to the fluid pressure in said circuit, means for continuously operating the change speed device in accordance with the displacements of said piston, adjustable valve means in the circuit for determining the law of displacement of said piston, an element for controlling the power delivered by said engine, and means interposed between said element and said valve means for controlling said valve means in accordance with variations of the power delivered by said engine, said element for controlling the power delivered by the engine comprising a throttle member and means for operating said throttle member, said means interposed between said element and said valve means comprising at least one rocking lever and means for connecting said rocking lever to said valve, said rocking lever including an arcuate slideway, said connecting means including rods pivotally secured to each other at one end thereof, one of said rods having a shoe at the other end thereof slidably engaged in said slideway when said throttle operating means are in released position, coinciding with the pivotal axis of said rod.

11. In a power plant including an engine for performing a certain work and a change speed device associated with said engine on the output side thereof, a control system which comprises, in combination, a fluid pump arranged to act as a regulator driven by said engine so as to be responsive to speed variations thereof, a circuit for said fluid pump, a piston subjected to the fluid pressure in said circuit, means for continuously operating the change speed device in accordance with the displacements of said piston, adjustable valve means in the circuit for determining the law of displacement of said piston, an element for controlling the power delivered by said engine, and means interposed between said element and said valve means for controlling said valve means in accordance with variations of the power delivered by said engine, said circuit having a safety valve therein intermediate said pump and said adjustable valve, and a centrifugal governor driven by said engine for operating said safety valve, said safety valve having an outlet opening, said governor actuating said valve to open said outlet opening when the engine is running idle, to close said outlet opening when the engine is running normally, and to prevent said fluid from passing from said pump to said adjustable valve when the engine is running at excessive speeds.

LEO ROBIN.
MATHIEU VAN ROGGEN.